US012358396B2

(12) United States Patent
Gogna et al.

(10) Patent No.: US 12,358,396 B2
(45) Date of Patent: Jul. 15, 2025

(54) PREDICTIVE FUEL CELL AND BATTERY POWER MANAGEMENT FOR HIGH SUSTAINED LOAD CONDITIONS

(71) Applicant: FORD GLOBAL TECHNOLOGIES, LLC, Dearborn, MI (US)

(72) Inventors: Naginder Gogna, Northville, MI (US); Jason Meyer, Canton, MI (US); Walter Joseph Ortmann, Saline, MI (US); Stanley L. Bower, Jr., Ann Arbor, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 564 days.

(21) Appl. No.: 17/676,715

(22) Filed: Feb. 21, 2022

(65) Prior Publication Data
US 2023/0264595 A1 Aug. 24, 2023

(51) Int. Cl.
*B60L 58/12* (2019.01)
*B60L 7/10* (2006.01)
*B60L 58/30* (2019.01)
*B60W 20/20* (2016.01)

(52) U.S. Cl.
CPC .............. *B60L 58/12* (2019.02); *B60L 7/10* (2013.01); *B60L 58/30* (2019.02); *B60W 20/20* (2013.01)

(58) Field of Classification Search
CPC ........... B60W 20/20; B60L 7/10; B60L 58/30; B60L 58/12
See application file for complete search history.

(56) References Cited

U.S. PATENT DOCUMENTS

| | | | |
|---|---|---|---|
| 2005/0284676 A1* | 12/2005 | King ..................... | B60W 10/08 180/65.22 |
| 2014/0114514 A1* | 4/2014 | Crombez .............. | B60W 20/13 903/930 |
| 2018/0290645 A1* | 10/2018 | Zhao ................. | B60W 50/0097 |

* cited by examiner

*Primary Examiner* — Andrew J Cromer
(74) *Attorney, Agent, or Firm* — David B. Kelley; Brooks Kushman P.C.

(57) ABSTRACT

A fuel cell and battery power management system for a fuel cell-powered vehicle includes an electric traction motor, a traction battery in electrical communication with the electric traction motor, a fuel cell stack in electrical communication with the traction battery and the electric traction motor, and a vehicle control system. The vehicle control system is configured to operate the vehicle with at a first discharge power level and a first charging power level if fuel cell power is sufficient alone to navigate the uphill grade and to build up battery state of charge by charging the traction battery at a second charging power level when the vehicle is approaching an uphill grade if fuel cell power is not sufficient alone to navigate the uphill grade. The vehicle control system is further configured to initiate proactive depletion of the battery SOC to enable powertrain braking and to provide regenerative power.

20 Claims, 2 Drawing Sheets

PREDICTIVE FUEL CELL AND BATTERY POWER MANAGEMENT FOR HIGH SUSTAINED LOAD CONDITIONS

TECHNICAL FIELD

In at least one aspect, the present invention relates to fuel cell and battery power management systems and methods.

BACKGROUND

Under certain circumstances, fuel cell power alone may not be sufficient to meet sustained high power demand use cases, e.g., going up the grade with the heavy payload or trailer. This limitation depends upon the fuel cell system sizing. Under these conditions, assistance from the battery power may be needed to meet the requested power demand. As the capability of battery power assist depends upon the battery's state of charge, vehicle performance may degrade over time as the SOC starts to deplete.

The motor and battery can be used to provide negative powertrain torque (either lift pedal torque or regen braking). However, the ability of the battery to accept the power generated from this type of operation also depends on the state of charge of the battery. Powertrain braking and eventually foundation braking performance may degrade over time as SOC starts to rise to its maximum limit.

Accordingly, there is a need for improved power management systems and methods for fuel cell-powered vehicles.

SUMMARY

In at least one aspect, a fuel cell and battery power management system for a vehicle is provided. The fuel cell and battery power management system includes an electric traction motor and a traction battery in electrical communication with the electric traction motor. The traction battery includes a battery state of charge. A fuel cell stack is in electrical communication with the traction battery and the electric traction motor. A vehicle control system is configured to operate the vehicle with a first discharge power level from the traction battery and a first charging power level to the traction battery if fuel cell power is sufficient alone to navigate an approaching uphill grade. The vehicle control system is further configured to build up the battery state of charge by charging the traction battery at a second charging power level if fuel cell power is not sufficient alone to navigate the approaching uphill grade. Characteristically, the second charging power level is greater than the first charging power level. The vehicle control system is further configured to initiate proactive depletion of the battery state of charge to enable powertrain braking by reducing the fuel cell power and supplying a battery discharge power up to a second discharging power level and/or shutting off the fuel cell when the vehicle is approaching a downhill grade.

In another aspect, a method for fuel cell and battery power management implemented by the systems herein is provided. The method includes operating a vehicle with a first discharge power level from a traction battery and a first charging power level to the traction battery if fuel cell power is sufficient alone to navigate an approaching uphill grade. The method also includes building-up the battery state of charge by charging the traction battery at a second charging power level if fuel cell power is not sufficient alone to navigate the approaching uphill grade. Typically, the second charging power level being greater than the first charging power level. Proactive depletion of the battery state of charge is initiated to enable powertrain braking by reducing the fuel cell power and supplying a battery discharge power up to a second discharging power level and/or shutting off the fuel cell when the vehicle is approaching a downhill grade.

In another aspect, connectivity-based information is used to estimate the grade coming ahead of a fuel cell-powered vehicle can be predicted. Knowing the grade information ahead of time, system can proactively build up the battery state of charge as needed so that the battery assist can be provided for an extended period. If connectivity-based grade information suggest that battery assist may not be sufficient for the uphill trip, a driver can be proactively coached using HMI interface to reduce the power demand to increase the likelihood of completing the trip or provide the warning about any potential power derate ahead.

In another aspect, the system can proactively deplete the battery if the vehicle is approaching a long downhill grade. For really long grades, the system can prioritize delivering negative powertrain lift pedal over the long duration and reduce the amount of regen braking (replaced with foundation brakes). This ensures that the powertrain is able to provide consistent negative powertrain torque and thus a consistent vehicle acceleration/deceleration feel. The total amount of energy recaptured would not be affected.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
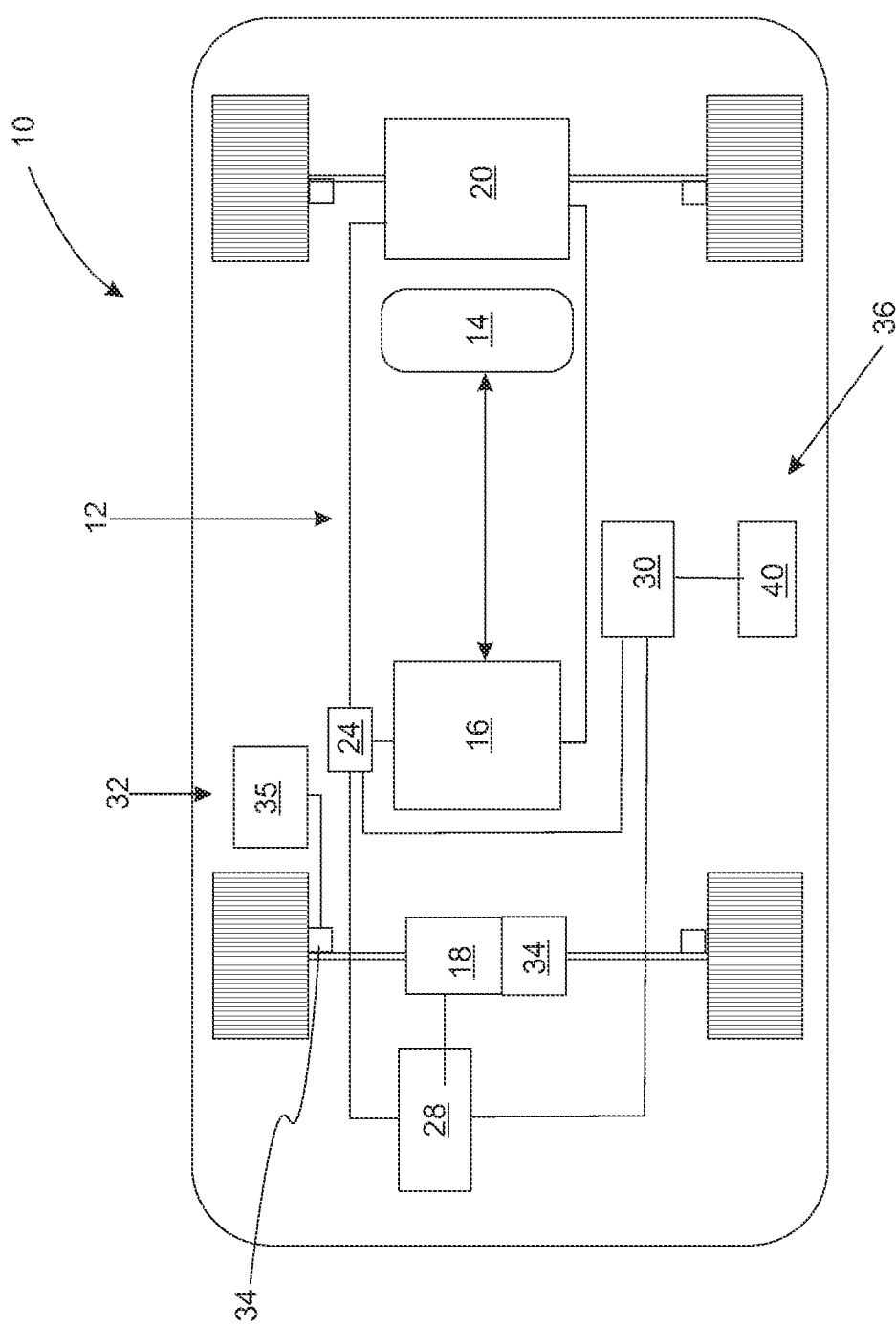
FIG. 1. Schematic of a fuel cell powered vehicle that includes a fuel cell and battery power management system.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directly connect one electronic component to another, these electronic components can be connected to each other as defined above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in an executable software object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Abbreviations

"GPS" means global positioning system.
"HMI" means human machine interface.
"regen" means regenerative.
"SOC" means state of charge.

Referring to FIG. 1, a schematic of a fuel cell-powered vehicle deploying a fuel cell and battery power management system is provided. Fuel cell-powered vehicle 10 includes fuel cell system 12, which includes fuel tanks 14 and fuel cell stack 16. In a refinement, fuel tanks 14 store molecular hydrogen which is provided to the fuel cell electrochemically producing energy therefrom. Fuel cell stack 16 can be used to power electric motor 18 and charge traction battery 20 in accordance with the fuel cell and battery power management method set forth in FIG. 2 and described below. Charging traction battery 20 increases the battery's SOC. Vehicle 10 also includes power electronics 24 that allows the selection of power from one or both of fuel cell 16 and traction battery 20 to be provided to electric motor 18. In a refinement, DC/DC converter 28 is in electrical communication with battery 20 and fuel cell stack 16. Power electronic controller 30 can be used to control the charging and discharging of battery 20 and the selection of one or both of fuel cell stack 18 and battery 20. Electric motor 18 is in mechanical communication with transmission 34, which rotates the drive shaft to provide propulsion of the vehicle 10. In another refinement, electric motor 18 and traction battery 20 can be used to provide negative powertrain torque (either as lift pedal-torque or regen braking). Vehicle 10 also includes braking system 32 that can include foundation brakes 34 (e.g., disc brakes) and brake control components 35 and components to assist in regenerative breaking Vehicle 10 also includes a vehicle control system 36 that that is configured to implement the steps for a method for fuel cell and battery power management (see FIG. 2). Vehicle control system 36 includes vehicle system controller 40, which implements a drive horizon module and one or more (or all) the steps of the method. Advantageously, vehicle control system 36 is further configured to receive grade information that includes a prediction from connectivity-based information for a grade coming ahead. In particular, vehicle control system 36 can be configured (e.g., by the drive horizon module) to detect and/or identify an approaching downhill or uphill grade or that the vehicle on an uphill or downhill grade. In this context, "downhill grade" indicates that the vehicle travels down a hill and "uphill grade" indicates that the vehicle travels up a hill. Vehicle control system 36 can use connection-based information in these applications. Such connection-based information can include GPS position data and map information from a mapping served (e.g., Google Maps). Such mapping information can include locations of uphill and downhill grades and the distance that such grades extend.

In a refinement, vehicle control system 36 includes power electronic controller 30, which manages electrical power flow from the fuel cell stack and the traction battery. The power electronic controller 30 can also control the speed of the electric motor and the torque produced therefrom. In a variation, the functions of vehicle system controller 40 and power electronic controller 42 can be combined in a single controller module. Typically, vehicle control system 36 includes one or more computer processors. Therefore, one or both of power electronic controller 30 and vehicle system controller 40 includes a computer process to implement steps of the method for fuel cell and battery power management.

Figure 2:
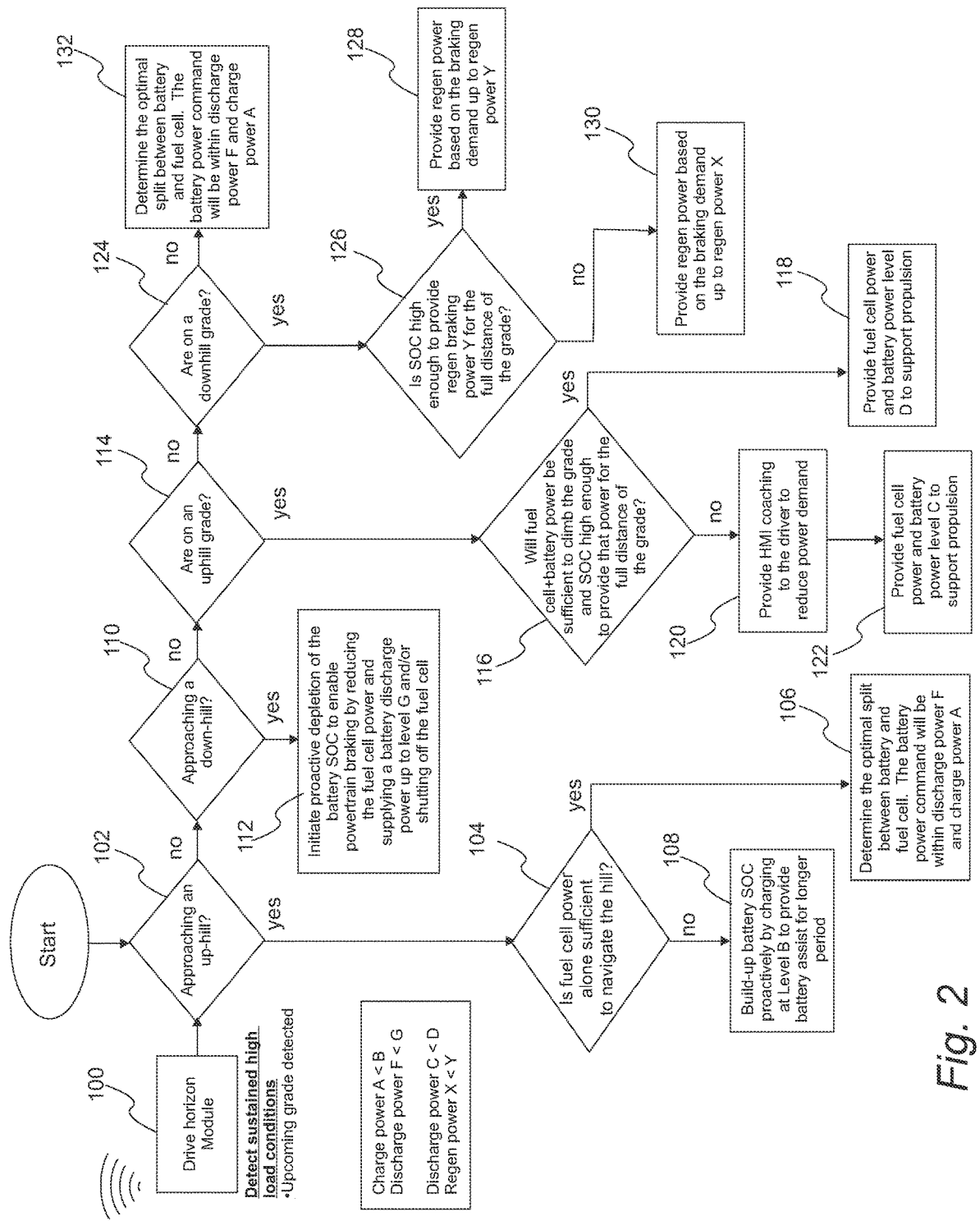
FIG. 2. Flowchart of a power management method implemented by the system of FIG. 1.

Referring to FIG. 2, a flow chart illustrating the operation of the fuel cell and battery power management system is provided. During operation, as depicted in step 100, a fuel cell-powered vehicle deploys a drive horizon module that can provide or obtain information about approaching uphill or downhill grades. In step 102, the drive horizon module (as implemented by the vehicle control system) determines if the vehicle is approaching an uphill grade. If the vehicle is approaching an uphill grade, the vehicle control system is configured to make a determination whether or not the fuel cell power alone is sufficient to navigate the uphill in step 104. If the fuel cell power is sufficient, the optimal division between battery and fuel cell is determined in step 106. In a refinement, a battery power command sets the battery discharging at first discharge power F and charging at first charging power level A. If the fuel cell power is sufficient, battery SOC is built-up in step 108 by proactively charging at a second charging power level B which is greater than the first charging power level A. Therefore, this proactive charging can provide battery assist for a longer period than would be possible if charging were to remain at lower charging power level A.

In step 110, the vehicle control system determines if the vehicle is approaching a downhill. In step 112, the vehicle control system initiates proactive depletion of the battery SOC to enable powertrain braking by reducing the fuel cell power and supplying a battery discharge power up to second discharging power level G and/or shutting off the fuel cell. Typically, the second discharging power level G is greater than the first discharging power level F.

In step 114, the vehicle control system determines if the vehicle is on an uphill grade. If the vehicle is on an uphill grade, a determination is made if the combination of fuel cell power and battery power is sufficient to climb the grade and SOC high enough to provide that power for the full distance of the grade in step 116. If the combination of fuel cell power and battery power is sufficient, fuel cell power and battery power at third discharging power level D are provided to support propulsion in step 118. If based on the current discharge power, the combination of fuel cell power and battery power is not sufficient, HMI coaching is provided to the driver to reduce power demand in step 120. In step 122, fuel cell power and battery third discharging power level C is provided to support propulsion. Characteristically, fourth battery discharging power level C is less than the third discharging power level D.

In some aspects, the human machine interface is configured to proactively coach the driver to reduce the power demand to increase the likelihood of completing a trip if connectivity-based grade information suggests that battery assist may not be sufficient for the uphill grade. Coaching can include suggestions for an alternative speed setting and/or suggestions for alternative routes.

In step 124, the vehicle control system determines if the vehicle is on a downhill grade. If the vehicle is on a downhill grade, the vehicle control system determines if the SOC high enough to provide first regen braking power level Y for the full distance of the grade in step 126. Advantageously, the system can prioritize delivering negative powertrain lift pedal over the long duration and reduce the amount of regen braking (replaced with foundation brakes). This ensures that the powertrain is able to provide consistent negative powertrain torque and thus a consistent vehicle acceleration/deceleration feel. The total amount of energy recaptured would not be affected. In this regard, regenerative power is provided up to first regenerative power level Y when the vehicle is on the downhill grade and the battery state of charge is sufficient to provide regenerative power for the full distance of the downhill grade (step 128). In step 130, regenerative power is provided based on braking demand up to a second regenerative power level X when the vehicle is on the downhill grade and the battery state of charge is not sufficient to provide regenerative power for the full distance of the downhill grade, first regenerative power level being greater than second regenerative power level. Characteristically, first regenerative power Y is greater than second regenerative power X.

If the vehicle is not approaching or on an uphill grade or a downhill grade, the vehicle control system is further configured to provide a division of power between the traction battery and fuel cell for powering the electric traction motor in step 132. The battery power command will be within first discharge power level F and first charge power level A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell and battery power management system for a vehicle comprising:
    electric traction motor;
    a traction battery in electrical communication with the electric traction motor, the traction battery having a battery state of charge;
    a fuel cell stack in electrical communication with the traction battery and the electric traction motor; and
    a vehicle control system configured to:
        receive grade information from connectivity-based mapping data to determine an approaching uphill grade or downhill grade;
        operate the vehicle with a first discharge power level from the traction battery and a first charging power level to the traction battery if fuel cell power is sufficient alone to navigate an approaching uphill grade;
        build-up battery state of charge by charging the traction battery at a second charging power level if fuel cell power is not sufficient alone to navigate the approaching uphill grade, wherein the second charging power level is dynamically adjusted based on a predicted energy demand for the approaching uphill grade; and
        initiate proactive depletion of the battery state of charge to enable powertrain braking by reducing the fuel cell power and supplying a battery discharge power up to a second discharging power level and/or shutting off the fuel cell when the vehicle is approaching a downhill grade, wherein the traction battery is proactively depleted if the vehicle is approaching a downhill grade to prioritize delivering negative powertrain torque over a duration of the downhill grade and reduce an amount of regenerative braking wherein are replaced with foundation brakes, ensuring the powertrain provides consistent negative powertrain torque and a consistent vehicle acceleration and deceleration feel.

2. The fuel cell and battery power management system of claim 1, wherein the vehicle control system is further configured, when the vehicle is on an uphill grade, to provide fuel cell power and third discharging power level that provides battery power to support propulsion.

3. The fuel cell and battery power management system of claim 2, wherein the vehicle control system is further configured, when the vehicle is on the uphill grade, to provide coaching to a driver through a human machine interface to reduce power demand if the battery state of charge after being increased is not sufficient to navigate the uphill grade.

4. The fuel cell and battery power management system of claim 3, wherein the human machine interface is configured to proactively coach the driver to reduce the power demand to increase a likelihood of completing a trip if connectivity-based grade information suggests that battery assist may not be sufficient for the uphill grade.

5. The fuel cell and battery power management system of claim 4, wherein the coaching includes suggestions for an alternative speed setting and/or suggestions for alternative routes.

6. The fuel cell and battery power management system of claim 5, wherein the human machine interface is further configured to provide a warning about any potential power derate ahead.

7. The fuel cell and battery power management system of claim 1, configured to:
    provide regenerative power up to first regenerative power level when the vehicle is on the downhill grade and the battery state of charge is sufficient to provide regenerative power for a full distance of the downhill grade; and
    provide regenerative power based on braking demand up to a second regenerative power level when the vehicle is on the downhill grade and the battery state of charge is not sufficient to provide regenerative power for the full distance of the downhill grade, first regenerative power level being greater than second regenerative power level.

8. The fuel cell and battery power management system of claim 1, wherein if the vehicle is not approaching or on an uphill grade or a downhill grade, the vehicle control system is further configured to provide a division of power between the traction battery and fuel cell for powering the electric traction motor.

9. The fuel cell and battery power management system of claim 1, wherein the vehicle control system is further configured to receive grade information that includes a prediction from connectivity-based information for a grade coming ahead.

10. The fuel cell and battery power management system of claim 1, wherein the vehicle control system is configured to prioritize delivering negative powertrain lift pedal over a long duration and reduce regenerative braking to provide consistent negative powertrain torque and thus consistent vehicle acceleration/deceleration feel.

11. The fuel cell and battery power management system of claim 1, wherein the vehicle control system is further configured to proactively deplete the traction battery if the vehicle is approaching a long downhill grade.

12. The fuel cell and battery power management system of claim 1 configured to provide negative powertrain torque.

13. The fuel cell and battery power management system of claim 12, wherein the negative powertrain torque is provided as either lift pedal torque or regenerative braking.

14. A method for fuel cell and battery power management comprising:
    receiving grade information from connectivity-based mapping data to determine an approaching uphill grade or downhill grade;
    operating a vehicle with a first discharge power level from a traction battery and a first charging power level to the traction battery if fuel cell power is sufficient alone to navigate an approaching uphill grade;

building-up battery state of charge by charging the traction battery at a second charging power level if fuel cell power is not sufficient alone to navigate the approaching uphill grade, the second charging power level being greater than the first charging power level; and initiating proactive depletion of a battery state of charge to enable powertrain braking by reducing the fuel cell power and supplying a battery discharge power up to a second discharging power level and/or shutting off the fuel cell when the vehicle is approaching a downhill grade, wherein the second charging power level is dynamically adjusted based on a predicted energy demand for the approaching uphill grade and wherein the traction battery is proactively depleted if the vehicle is approaching a downhill grade to prioritize delivering negative powertrain torque over a duration of the downhill grade and reduce an amount of regenerative braking wherein are replaced with foundation brakes, ensuring the powertrain provides consistent negative powertrain torque and a consistent vehicle acceleration and deceleration feel.

15. The method of claim 14 further comprising providing fuel cell power and third discharging power level that provides battery power to support propulsion when the vehicle is on an uphill grade.

16. The method of claim 15 further comprising providing coaching to a driver through a human machine interface to reduce power demand if the battery state of charge after being increased is not sufficient to navigate the uphill grade.

17. The method of claim 16 further comprising proactively coach the driver to reduce the power demand to increase a likelihood of completing a trip if connectivity-based grade information suggests that battery assist may not be sufficient for the uphill grade.

18. The method of claim 16 further comprising:

providing regenerative power up to first regenerative power level when the vehicle is on the downhill grade and the battery state of charge is sufficient to provide regenerative power for a full distance of the downhill grade; and providing regenerative power based on braking demand up to a second regenerative power level when the vehicle is on the downhill grade and the battery state of charge is not sufficient to provide regenerative power for the full distance of the downhill grade, first regenerative power level being greater than second regenerative power level.

19. The method of claim 14 further comprising providing a division of power between the traction battery and fuel cell for powering an electric traction motor if the vehicle is not approaching or on an uphill grade or a downhill grade.

20. The method of claim 14 further comprising receiving grade information that includes a prediction from connectivity-based information for a grade coming ahead.

* * * * *